(12) United States Patent
Huang et al.

(10) Patent No.: US 8,094,411 B2
(45) Date of Patent: Jan. 10, 2012

(54) SLIDER WITH POCKETS IN FRONT OF AIR BEARING SURFACE

(75) Inventors: Weidong Huang, San Jose, CA (US); Oscar J. Ruiz, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 719 days.

(21) Appl. No.: 12/250,730

(22) Filed: Oct. 14, 2008

(65) Prior Publication Data

US 2010/0091406 A1   Apr. 15, 2010

(51) Int. Cl.
*G11B 5/60* (2006.01)
(52) U.S. Cl. .................................................. 360/235.8
(58) Field of Classification Search ............... 360/234.3, 360/236, 237
See application file for complete search history.

(56) References Cited

U.S. PATENT DOCUMENTS

| | | | |
|---|---|---|---|
| 6,574,074 B2 | 6/2003 | Bolasna et al. | |
| 6,574,190 B1 | 6/2003 | Hu | |
| 6,747,847 B2 | 6/2004 | Stoebe et al. | |
| 7,245,455 B2 * | 7/2007 | Rajakumar | 360/235.8 |
| 7,978,435 B2 * | 7/2011 | Hanyu | 360/235.6 |
| 2007/0188925 A1 * | 8/2007 | Ishihara | 360/235.8 |
| 2008/0024924 A1 | 1/2008 | Bolasna et al. | |
| 2008/0130173 A1 | 6/2008 | Park | |
| 2008/0158724 A1 | 7/2008 | Dorius et al. | |
| 2008/0247089 A1 * | 10/2008 | Ruiz | 360/235.4 |
| 2009/0135522 A1 * | 5/2009 | Takahashi et al. | 360/235.4 |
| 2011/0090597 A1 * | 4/2011 | Hanyu | 360/235.5 |

* cited by examiner

*Primary Examiner* — Angel A. Castro
(74) *Attorney, Agent, or Firm* — Patterson & Sheridan, LLP

(57) ABSTRACT

A slider for use with disk drive data storage devices includes a topography that defines features of the slider. The features facilitate in controlling peak pressure, providing stiffness, and/or inhibiting lubricant accumulation on the slider. For example, the features include an air bearing surface and a cavity disposed in front of the air bearing surface. The cavity is closed on all sides by sidewalls.

20 Claims, 4 Drawing Sheets

SLIDER WITH POCKETS IN FRONT OF AIR BEARING SURFACE

BACKGROUND OF THE INVENTION

1. Field of the Invention

Embodiments of the invention generally relate to a slider within disk drive data storage devices.

2. Description of the Related Art

In an electronic data storage and retrieval system, a magnetic head typically includes a read/write transducer for retrieving and storing magnetically encoded information on a magnetic recording medium or disk. A suspended slider supports the magnetic head. In operation, the slider rides on a cushion or bearing of air above the surface of the disk as the disk is rotating at its operating speed. The slider includes an air bearing surface (ABS) designed to generate an air bearing force that counteracts a preload bias urging the slider toward the disk. The slider flies above and out of contact with the disk as a result of the ABS.

Problems with prior slider designs include lubricant pickup, high peak pressure, and insufficient stiffness of the slider. Lubricant pickup occurs when lubricant coated on the disk collects on the slider. Once collected on the slider, the lubricant tends to interfere with the fly-height and result in poor magnetic interfacing between the slider and the disk. Further, the high peak pressure associated with air pressure between the slider and the disk may contribute to lubricant pickup. As the peak pressure increases, ability to compensate and efficiency of any compensation for fly-height of the magnetic head decreases.

Therefore, a need exists for sliders that improve performance of disk drive data storage devices.

SUMMARY OF THE INVENTION

In one embodiment, a slider for supporting a sensor element proximate to a movable data medium includes an air bearing surface (ABS) formed on a body. The body includes a leading end and a trailing end with a magnetic head disposed on the body relatively closer to the trailing end than the leading end. A preface area formed on the body has a first surface recessed relative to the ABS, wherein the preface area extends from part of the ABS toward the leading end of the body, and wherein the body defines a cavity within the preface area and sharing a common boundary with the ABS, wherein the cavity includes a second surface recessed further relative to the ABS than the first surface and the cavity is closed on all sides by sidewalls surrounding the second surface of the cavity.

According to one embodiment, a slider for supporting a sensor element proximate to a movable data medium includes a first air bearing surface (ABS) formed on a body relatively closer to a leading end of the body than a trailing end of the body. The slider further includes a second ABS formed on the body relatively closer to the trailing end of the body than the first ABS and separated from the first ABS by recessed regions of the body. A magnetic head is disposed on the body relatively closer to the trailing end of the body than the leading end of the body. A second ABS preface area formed on the body has a first surface recessed relative to the second ABS, wherein the second ABS preface area is partly surrounded by the second ABS and extends from part of the second ABS toward the leading end of the body. A second ABS cavity in the body within the second ABS preface area includes a second surface recessed further relative to the second ABS than the first surface and the second ABS cavity is closed on all sides by sidewalls surrounding the second surface of the second ABS cavity.

For one embodiment, a hard disk drive data storage assembly includes a rotatable magnetic disk, an actuator arm extending across the disk, and a slider coupled to the actuator arm that maintains the slider in a movable operative relationship with the disk. A body of the slider forms an air bearing surface (ABS) and includes a leading end and a trailing end. A magnetic head is disposed on the body relatively closer to the trailing end than the leading end. A preface area having a first surface recessed relative to the ABS extends from part of the ABS toward the leading end of the body. A cavity in the body within the preface area shares a common boundary with the ABS, wherein the cavity includes a second surface recessed further relative to the ABS than the first surface and the cavity is closed on all sides by sidewalls surrounding the second surface of the cavity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the invention relate to topography of a slider for use with disk drive data storage devices. Features defined by the topography facilitate in controlling peak pressure, providing stiffness, and/or inhibiting lubricant accumulation on the slider. For example, the features include an air bearing surface and a cavity disposed in front of the air bearing surface. The cavity is closed on all sides by sidewalls.

Figure 1:
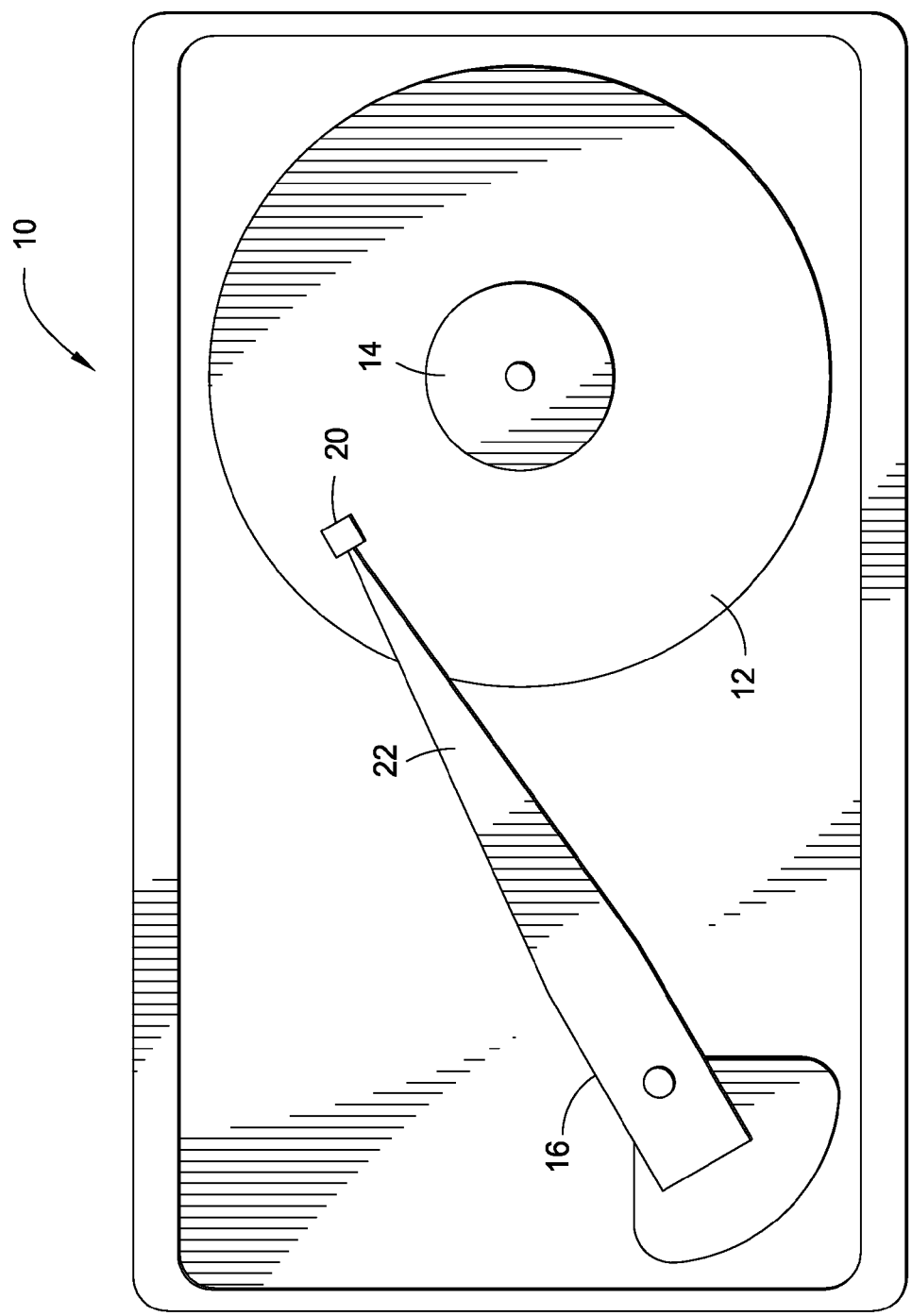
FIG. 1 is a top plan view of a hard disk drive including a slider, according to embodiments of the invention.

FIG. 1 illustrates a hard disk drive 10 that includes a magnetic media hard disk 12 mounted upon a motorized spindle 14. An actuator arm 16 is pivotally mounted within the hard disk drive 10 and movable relative to the disk 12. The actuator arm 16 includes a slider 20 disposed upon a distal end 22 of the actuator arm 16 that extends across the disk 12. During operation of the hard disk drive 10, the hard disk 12 rotates upon the spindle 14 and the slider 20 acts as an air bearing adapted for flying above the surface of the disk 12. The slider 20 includes a magnetic head for reading data from the disk 12 and/or writing data to the disk 12.

Figure 2:
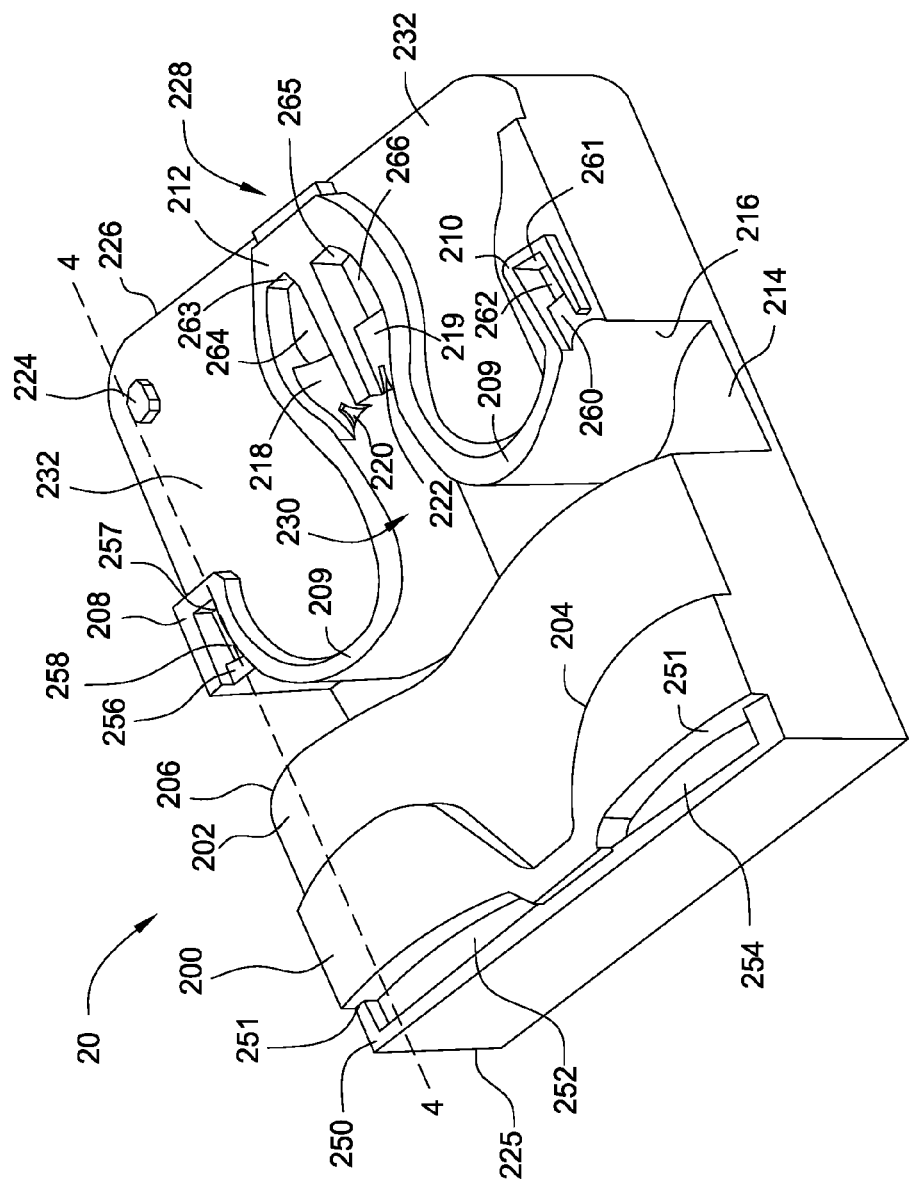
FIG. 2 is a bottom perspective view of the slider showing a disk facing surface of the slider, according to embodiments of the invention.
Figure 3:
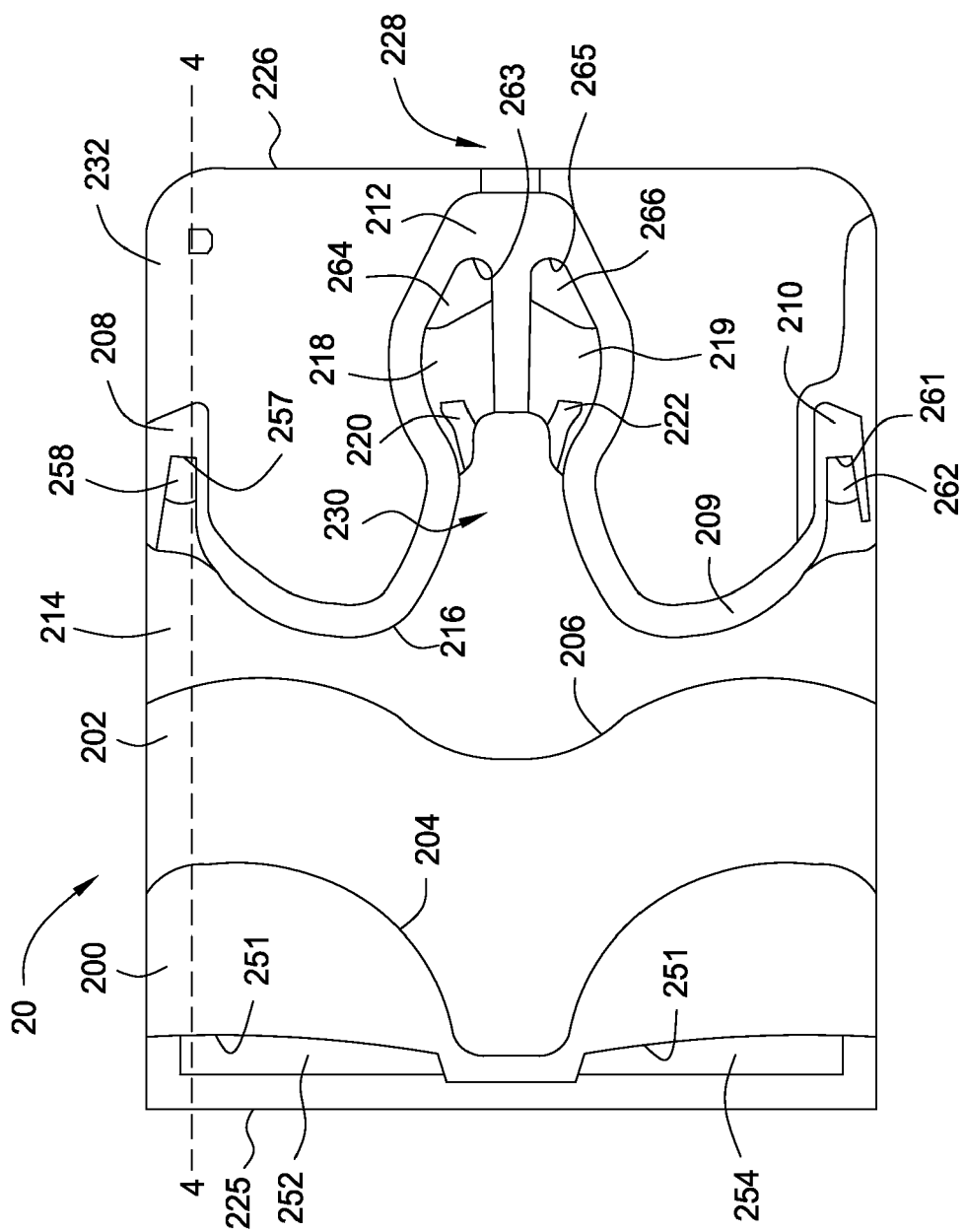
FIG. 3 is a bottom view of the slider, according to embodiments of the invention.

FIGS. 2 and 3 respectively illustrate a bottom perspective view and a bottom view of the slider 20 showing a disk facing surface of the slider 20 in one embodiment. The slider 20 defines a body with a leading end 225 and a trailing end 226. Rotating of the disk 12 (shown in FIG. 1) exposes the leading end 225 to air flow induced by this rotation. Direction of air inflow to outflow corresponds with the leading end 225 being disposed ahead of the trailing end 226 that is downstream of the leading end 225. In some embodiments, the magnetic head 228 further identifies the leading and trailing ends 225, 226 by being relatively closer to the trailing end 226 than the leading end 225. A roll direction is defined perpendicular across the slider 200 relative to a pitch direction (i.e., corresponding to line 4-4) from the leading end 225 to the trailing end 226.

From the leading end 225 toward the trailing end 226, the slider 20 includes a leading air bearing surface (ABS) 200, a recessed shelf 202, and a trench 214. The slider 20 further includes a first side ABS 208, a second side ABS 210, a trailing ABS 212, and a negative pressure recessed region 232 that are all disposed toward the trailing end 226 of the slider 200 from the trench 214. The leading ABS 200, the first side ABS 208, the second side ABS 210, and the trailing ABS 212 provide a coplanar ABS reference from which depth of recessed regions of the slider 20 are gauged. Any ABS described herein may generate an air bearing force during flying of the slider 20. Negative pressure generated in the recessed region 232 provides part of opposing force to the air bearing force. A landing pad 224 within the recessed region 232 extends less than an ABS from the recessed region 232 in order to provide a less rough contact surface than that surrounding the landing pad 224 should this area of the slider 20 contact with the disk.

The first side ABS 208 is spaced in the roll direction from the second side ABS 210. The trailing ABS 212 occupies a central region of the slider 20 in the roll direction. An ABS interconnecting wall 209 may connect without any depth variation the first side ABS 208 to the trailing ABS 212 and the second side ABS 210 to the trailing ABS 212.

The leading ABS 200 extends across the slider 20 in the roll direction. Size of the leading ABS 200 in the pitch direction varies across the roll direction with the size narrowing in a middle of the leading ABS 200. This creates larger areas of the leading ABS 200 spaced in the roll direction from one another by the middle of the leading ABS 200. For some embodiments, the leading ABS 200 may extend in a discontinuous manner across the slider 20 in the roll direction, such as if the middle of the leading ABS 200 is not present.

In some embodiments, the middle of the leading ABS 200 protrudes toward the leading end 225 and separates a first cavity 252 from a second cavity 254. The first and second cavities 252, 254 may be joined to form a single continuous cavity for some embodiments. The first and second cavities 252, 254 are disposed in a leading preface area. The leading preface area extends from the leading ABS 200 toward the leading end 225 and has a leading surface 250 recessed relative to the leading ABS 200. The first and second cavities 252, 254 define another surface recessed relative to the leading ABS 200 further than the leading surface 250.

Figure 4:
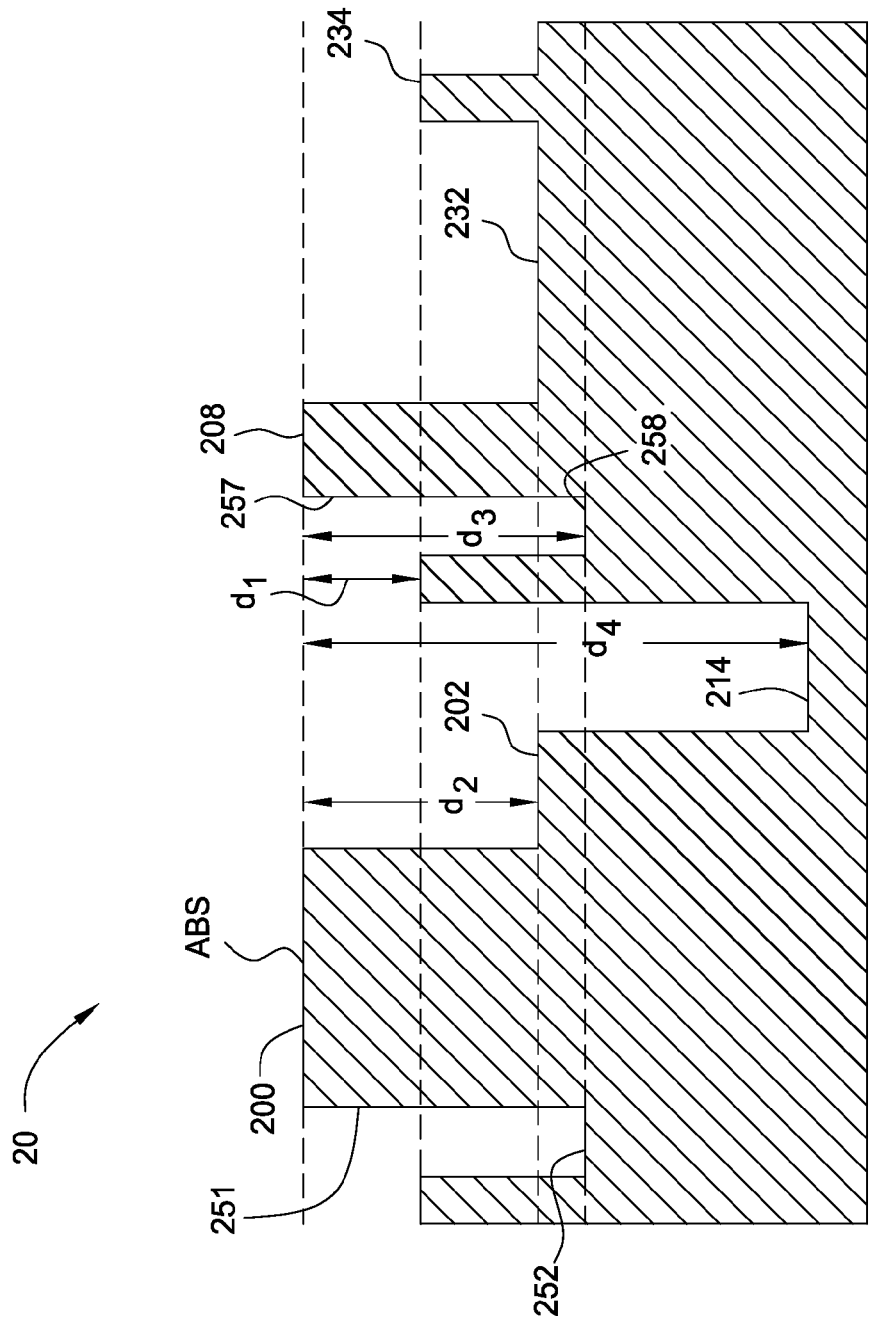
FIG. 4 is a cross-sectional view of the slider taken across line 4-4 of FIGS. 2 and 3, according to embodiments of the invention.

FIG. 4 shows a cross-sectional view of the slider 20 taken across line 4-4 of FIGS. 2 and 3 in order to illustrate such depth changes in topography of the slider 20. The first cavity 252 is recessed a third depth ($d_3$) relative to the ABS reference. In some embodiments, the third depth is between 0.5 microns and 5.0 microns (e.g., about 0.57 microns). In addition to the first and second cavities 252, 254, third and fourth cavities 258, 262 are in front of the first side ABS 208 and the second side ABS 210, respectively, while fifth and sixth cavities 264, 266 are disposed in front of the trailing ABS 212. Some embodiments include any combination of one or more of the cavities 252, 254, 258, 262, 264, 266. In addition, the cavities 252, 254, 258, 262, 264, 266 may have different depths or a common depth and may have depths matching other features in order to reduce etching steps. The cavities 252, 254, 258, 262, 264, 266 are each closed on all sides by sidewalls.

In some embodiments, the first and second cavities 252, 254 each have an area that is between 30 microns by 30 microns and 500 microns (in the roll direction) by 100 microns (in the pitch direction). If only one of the first and second cavities 252, 254 is present, dimensions may range from 30 microns by 30 microns to 700 microns (in the roll direction) by 200 microns (in the pitch direction). The third, fourth, fifth and sixth cavities 258, 262, 264, 266 may each have dimensions in the roll and pitch directions between 20 microns by 20 microns and 100 microns by 100 microns.

A first side entry surface 256 and the third pocket 258 that is further recessed than the first side entry surface 256 provide a first side preface area partially surrounded by the first side ABS 208. Similarly, a second side entry surface 260 and the fourth pocket 262 that is further recessed than the second side entry surface 260 provide a second side preface area partially surrounded by the second side ABS 210. The side preface areas may open into the trench 214 with the first side ABS 208 and the second side ABS 210 each forming a general u shape around respective ones of the preface areas. For the trailing ABS 212, the fifth and sixth cavities 264, 266 form further recessed areas respectively within first and second channels 218, 219 to provide a trailing preface area.

A front-edge 251 of the leading ABS 200 defines a step between the leading ABS 200 and the first cavity 252 as well as the second cavity 254. Since the front-edge 251 of the leading ABS 200 forms one of the sidewalls of the first and second cavities 252, 254, the leading ABS 200 shares a common boundary with each of the first and second cavities 252, 254. Similarly, a front-edge 257 of the first side ABS 208 extends to the third cavity 258, and a front-edge 261 of the second side ABS 210 extends to the fourth cavity 262. Further, first and second front-edges 263, 265 of the trailing ABS 208 form sidewalls, respectively, for the fifth and sixth cavities 264, 266. While each cavity is shown immediately in front of a corresponding ABS, any cavity may be disposed up to 50 microns away from a front-edge of the ABS in which the cavity is in front.

In operation, an entire area of the cavity (e.g., any one of the cavities 252, 254, 258, 262, 264, 266) is pressurized with air. Without the cavity, pressure is concentrated over a relatively smaller area. This larger area enables utilizing lower peak pressure, which is desirable since lower pressure is believed to reduce lubricant pickup and results in reduction of thermo-flying-height-control (TFC) power. The TFC functions by heating the magnetic head 228 and/or portions of the trailing ABS 212 to cause thermal expansion that makes the magnetic head 228 protrude. When the magnetic head 228 protrudes, air pressure under the slider 20 increases causing the fly-height to increase and negate some fractional amount of this protrusion. This fractional amount defines the compensation ratio that is reduced by reduction in the peak pressure resulting from the cavities. While the fifth and sixth cavities 264, 266 adjacent the trailing ABS 212 play more of a role with the TFC, the first, second, third and fourth cavities 252, 254, 258, 262, by being filled with pressurized air, help to create stiffness of the slider 20.

When there is no cavity in front of a load carrying ABS, a stagnation area forms where the air velocity approaches zero in front of a solid wall. If the air flow carries lubricant droplets or any other type of contaminants, they accumulate on the surfaces of the stagnation area. The cavities as described herein act as storage devices for any contaminants and also weaken the stagnation area (e.g., at the front-edge 251 of the leading ABS 200). As a result, the cavity inhibits accumulation in front of the ABS since any stagnation line that may occur is in front of the cavity and farther away from the ABS that has a relatively higher pressure. Even if some contaminants still accumulate, the contaminants deposit within the cavity farther from the ABS. This increased distance from the ABS at least inhibits lubricant flowing onto the ABS where any lubricant increases the fly-height.

The recessed shelf 202 abuts a back-edge 204 of the leading ABS 200 creating a step at the back-edge 204 of the leading ABS 200. The shelf 202 at least inhibits lubricant accumulation behind the leading ABS 200. The strength of a vacuum created behind the leading ABS 200 can influence tendency to have lubricant accumulation at this location. The amount of pressure drop following the leading ABS 200 decreases as depth of the shelf 202 decreases.

The shelf 202 is recessed a second depth ($d_2$) relative to the ABS reference. In some embodiments, the second depth is less than 2.0 micron (e.g., about 0.57 microns). A distance of 5.0 microns to 300 microns may separate the back-edge 204 of the leading ABS 200 from a back-edge 206 of the shelf 202. A step transition between the shelf 202 and the trench 214 defines the back-edge 206 of the shelf 202.

Stagnation of air flow facilitates lubricant accumulation on the slider 20 since there is no flushing action when velocity of the air flow goes to zero. To mitigate stagnation, one or both of the back-edges 204, 206 of the leading ABS 200 and the recessed shelf 202 curve in profile across the roll direction. Since curved shapes result in only discrete points of stagnation, this curvature at least inhibits a line of stagnation in an area between the leading ABS 200 and the trailing ABS 212. In some embodiments, one or both of the back-edges 204, 206 may lack any straight sections across the slider 20 in the roll direction.

The trench 214 extends across the slider 20 in the roll direction and is disposed between the shelf 202 and the trailing ABS 212 such that the leading ABS 200 and the trailing ABS 212 are separated by the shelf 202 and the trench 214. The trench 214 has a fourth depth ($d_4$) that is greater than the second depth and that is sufficient such that air is at atmospheric pressure in the trench 214 during operation of the slider 20. For example, the fourth depth may be about 4.0 microns. A center extension 230 of the trench 214 aligns with the trailing ABS 212 and extends further toward the trailing end 226 than adjacent portions of the trench 214. The center extension 230 holds air for supply to the trailing ABS 212.

A back-edge 216 of the trench 214 may also define a curved profile across the roll direction of the slider 20 to further inhibit forming lines of stagnation in the area between the leading ABS 200 and the trailing ABS 212. The trench 214 is defined between a step creating the back-edge 216 of the trench 214 and the back-edge 206 of the shelf 202. Transition from the interconnecting wall 209 to the trench 214 and from the entry surfaces 256, 260 to the trench 214 may form part of the back-edge 216 of the trench 214.

In some embodiments, the trailing ABS 212 forms a general "W" shape (lowercase omega) when viewed from the bottom side of the slider 20 that faces the disk. To form this shape, the first channel 218 and the second channel 219 are surrounded by the trailing ABS 212 except where the channels 218, 219 open into the central extension 230 of the trench 214. Further, the channels 218, 219 extend along the pitch direction with a central part of the trailing ABS 212 disposed between at least portions of the channels 218, 219. The channels 218, 219 thus each have sidewalls that face one another and define a boundary of the trailing ABS 212. A first trough 220 forms a portion of the first channel 218 and extends to the trench 214. The first trough 220 is less deep relative to the trailing ABS 212 than the trench 214, and is deeper relative to the trailing ABS 212 than adjacent portions of the first channel 218. The second channel 219 includes a second trough 222 having a similar arrangement as the first trough 220 with respect to the first channel 218. For some embodiments, only one of the channels 218, 219 may be present.

Compared to an arrangement without the troughs 220, 222, the channels 218, 219 with respective ones of the troughs 220, 222 reduce fly-height of the slider 20 when in helium such that there is less atmosphere dependent variation in the fly-height. Further, the troughs 220, 222 can balance the fly-height from inner diameter to outer diameter (i.e., in the roll direction with the first trough 220 corresponding to the inner diameter and the second trough corresponding to the outer diameter). Variables such as length and angles of the troughs 220, 222 enable control of peak pressure ahead of the trailing ABS 212 during operation. Further, the troughs 220, 222 balance the TFC compensation ratio from the inner diameter to the outer diameter. The compensation ratio is not constant from the inner diameter to the outer diameter without the troughs 220, 222.

In some embodiments, the first and second troughs 220, 222 have different dimensions and/or angles relative to the pitch direction. For example, the first trough 220 may be shorter in length than the second trough 222. Configuration of the troughs 220, 222 can compensate for inner diameter air flow being lower than outer diameter air flow and air flow entry angles for the inner diameter air flow being different than the outer diameter air flow. Angle of the troughs 220, 222 may align with incoming air flow. As the depth and/or length of the troughs 220, 222 increase, the fly-height raises. For some embodiments, the troughs 220, 222 have a deepness that is the second depth ($d_2$) and is less than 2.0 micron. While the shelf 202 and the troughs 220, 222 may have different depths, utilizing the second depth for both may reduce etching steps. The remainder of the channels 218, 219 outside of the troughs 220, 222 may be at a first depth ($d_1$) less than the second depth. For example, the first depth may be about 0.12 microns. The length of the troughs 220, 222 may be between 5 and 200 microns. Angles of the troughs 220, 222 relative to the pitch direction may range from 0° to 45° and 0° to −45°.

Conventional mask and etching techniques can create the slider 20, according to one embodiment. For example, shallow ion milling can remove material at locations identified by the first depth while the second depth may be achieved by deep ion milling. Reactive ion etching at the trench 214 can produce the third depth.

While the foregoing is directed to embodiments of the present invention, other and further embodiments of the invention may be devised without departing from the basic scope thereof, and the scope thereof is determined by the claims that follow.

What is claimed is:

1. A slider for supporting a sensor element proximate to a movable data medium, comprising:
   an air bearing surface (ABS) formed on a body, wherein the body includes a leading end and a trailing end;
   a magnetic head disposed on the body relatively closer to the trailing end than the leading end; and
   a preface area formed on the body and having a first surface recessed relative to the ABS, wherein the preface area extends from part of the ABS toward the leading end of the body; and wherein the body defines a cavity within the preface area and sharing a common boundary with the ABS, wherein the cavity includes a second surface recessed further relative to the ABS than the first surface and the cavity is closed on all sides by sidewalls surrounding the second surface of the cavity.

2. The slider of claim 1, wherein the preface area is partly surrounded by the ABS.

3. The slider of claim 1, wherein the cavity has a depth between 0.5 microns and 5.0 microns relative to the ABS.

4. The slider of claim 1, wherein the cavity has an area between 20 microns by 20 microns and 700 microns by 200 microns.

5. The slider of claim 1, wherein the preface area forms a channel that opens into a trench that is recessed further relative to the ABS than the first surface.

6. The slider of claim 1, wherein the ABS forms a ω-shape.

7. A slider for supporting a sensor element proximate to a movable data medium, comprising:
   a first air bearing surface (ABS) formed on a body relatively closer to a leading end of the body than a trailing end of the body;
   a second ABS formed on the body relatively closer to the trailing end of the body than the first ABS and separated from the first ABS by recessed regions of the body;
   a magnetic head disposed on the body relatively closer to the trailing end of the body than the leading end of the body;
   a second ABS preface area formed on the body and having a first surface recessed relative to the second ABS, wherein the second ABS preface area is partly surrounded by the second ABS and extends from part of the second ABS toward the leading end of the body; and
   a second ABS cavity in the body within the second ABS preface area, wherein the second ABS cavity includes a second surface recessed further relative to the second ABS than the first surface and the second ABS cavity is closed on all sides by sidewalls surrounding the second surface of the second ABS cavity.

8. The slider of claim 7, wherein the second ABS cavity shares a common boundary with the second ABS.

9. The slider of claim 7, wherein the second ABS forms a ω-shape.

10. The slider of claim 7, further comprising:
    an additional preface area formed on the body and having a third surface recessed relative to the second ABS, wherein the additional preface area is partly surrounded by the second ABS and extends from part of the second ABS toward the leading end of the body; and
    an additional cavity in the body within the additional preface area, wherein the additional cavity includes a fourth surface recessed further relative to the second ABS than the third surface and the additional cavity is closed on all sides.

11. The slider of claim 10, wherein the second ABS forms a ω-shape with the second ABS cavity disposed in an interior of the ω-shape on a first side thereof and the additional cavity disposed in the interior of the ω-shape on a second side thereof.

12. The slider of claim 10, wherein the preface areas form channels that open into a trench that is recessed further relative to the second ABS than the first and third surfaces.

13. The slider of claim 7, further comprising:
    a first ABS preface area formed on the body and having a third surface recessed relative to the first ABS, wherein the first ABS preface area extends from part of the first ABS toward the leading end of the body; and
    a first ABS cavity in the body within the first ABS preface area, wherein the first ABS cavity includes a fourth surface recessed further relative to the first ABS than the third surface and the first ABS cavity is closed on all sides.

14. The slider of claim 7, further comprising:
    a first ABS preface area formed on the body and having a third surface recessed relative to the first ABS, wherein the first ABS preface area extends from part of the first ABS toward the leading end of the body; and
    two separate first ABS cavities in the body within the first ABS preface area, wherein each of the first ABS cavities includes a fourth surface recessed further relative to the first ABS than the third surface and each of the first ABS cavities is closed on all sides.

15. The slider of claim 14, further comprising:
    a third ABS partially surrounding a third ABS cavity closed on all sides; and
    a fourth ABS partially surrounding a fourth ABS cavity closed on all sides.

16. The slider of claim 7, further comprising:
    a third ABS partially surrounding a third ABS cavity closed on all sides; and
    a fourth ABS partially surrounding a fourth ABS cavity closed on all sides.

17. The slider of claim 16, wherein an interconnecting wall connects without any depth variation the third ABS to the second ABS and the fourth ABS to the second ABS.

18. The slider of claim 7, wherein the second ABS cavity has a depth between 0.5 microns and 5.0 microns relative to the second ABS.

19. A hard disk drive data storage assembly, comprising:
    a rotatable magnetic disk;
    an actuator arm extending across the disk; and
    a slider coupled to the actuator arm that maintains the slider in a movable operative relationship with the disk, wherein a body of the slider forms:
      an air bearing surface (ABS), wherein the body includes a leading end and a trailing end;
      a magnetic head disposed on the body relatively closer to the trailing end than the leading end;
      a preface area having a first surface recessed relative to the ABS, wherein the preface area extends from part of the ABS toward the leading end of the body; and
      a cavity in the body within the preface area and sharing a common boundary with the ABS, wherein the cavity includes a second surface recessed further relative to the ABS than the first surface and the cavity is closed on all sides by sidewalls surrounding the second surface of the cavity.

20. The assembly of claim 19, wherein the ABS forms a ω-shape with the cavity disposed in an interior of the ω-shape.

* * * * *